United States Patent
Edwards et al.

(10) Patent No.: US 12,111,904 B2
(45) Date of Patent: *Oct. 8, 2024

(54) SYSTEMS AND METHODS FOR AUTHENTICATING USERS

(71) Applicant: Capital One Services, LLC, McLean, VA (US)

(72) Inventors: Joshua Edwards, Philadelphia, PA (US); Lukiih Cuan, Washington, DC (US); Eric Loucks, Broomfield, CO (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,926

(22) Filed: Jun. 8, 2023

(65) Prior Publication Data

US 2023/0315828 A1 Oct. 5, 2023

Related U.S. Application Data

(63) Continuation of application No. 16/850,366, filed on Apr. 16, 2020, now Pat. No. 11,714,890.

(51) Int. Cl.
| | | |
|---|---|---|
| *G06F 21/34* | (2013.01) | |
| *G06F 40/30* | (2020.01) | |
| *G06T 7/10* | (2017.01) | |
| *G06T 7/70* | (2017.01) | |

(Continued)

(52) U.S. Cl.
CPC .............. *G06F 21/34* (2013.01); *G06F 40/30* (2020.01); *G06T 7/10* (2017.01); *G06T 7/70* (2017.01); *G06T 11/20* (2013.01); *G06T 19/006* (2013.01); *G06F 2221/2103* (2013.01); *G06T 2210/12* (2013.01)

(58) Field of Classification Search
CPC .... G06V 20/20; G06V 2201/10; G06T 11/20; G06T 7/10; G06T 19/006; G06T 7/70; G06T 2210/12; G06T 1/00; G06F 21/34; G06F 40/30; G06F 21/36; G06F 3/011; G06F 40/56; G06F 2221/2103; G06F 21/31; G06F 21/45; G06F 21/46; G06F 21/33; H04L 63/08; H04L 63/083; H04W 12/06; H04W 12/63; G06Q 20/40
See application file for complete search history.

(56) References Cited

U.S. PATENT DOCUMENTS

| | | | |
|---|---|---|---|
| 2017/0277880 A1* | 9/2017 | Todasco | G06F 16/29 |
| 2020/0210768 A1* | 7/2020 | Turkelson | G06V 40/63 |
| 2020/0217952 A1* | 7/2020 | Rider | G06F 18/251 |

* cited by examiner

*Primary Examiner* — Xilin Guo
(74) *Attorney, Agent, or Firm* — Foley & Lardner LLP

(57) ABSTRACT

In some embodiments, an authentication prompt may be generated based on (i) an object, detected in an image stream of an environment of a user, satisfying one or more criteria and (ii) object data associated with the detected object. The criteria may include (i) the object being in a plurality of different samples and (ii) the object being in a first spatial region of a first sample of the different samples, where the first spatial region of the first sample is a spatial region at which the user looked. An authentication response may be obtained from a user device of the user in connection with the authentication prompt, and the user may be authenticated based on the authentication response obtained from the user device.

20 Claims, 8 Drawing Sheets

(51) Int. Cl.
*G06T 11/20* (2006.01)
*G06T 19/00* (2011.01)

SYSTEMS AND METHODS FOR AUTHENTICATING USERS

CROSS-REFERENCE TO RELATED APPLICATION(S)

This application is a continuation of U.S. patent application Ser. No. 16/850,366, filed Apr. 16, 2020. The content of the foregoing application is incorporated herein in its entirety by reference.

TECHNICAL FIELD

The present disclosure relates generally to systems and methods for providing authentication of a user, and more particularly, to an authentication system that uses image data obtained by an augmented-reality wearable device associated with a user to authenticate the user.

BACKGROUND

A computing system may require authentication of a user before allowing the user to access a resource. Authentication may include requiring the user provide evidence of their identity. Such evidence can include things known to the user, but not known to others (e.g., passwords, pin numbers, predetermined answers to authentication questions, etc.). Multi-factor authentication systems may require a user provide such knowledge evidence in addition to possession evidence (something the user has) or inherency evidence (something the user is).

SUMMARY

Systems and methods for knowledge-based authentication are disclosed. The systems and methods can perform knowledge-based authentication using an authentication system configured to authenticate a user by the use of authentication questions. The authentication questions can be automatically generated based on object data received from an augmented reality system (AR system) associated with the user.

The disclosed embodiments include an authentication system. The authentication system can include at least one processor and at least one computer-readable medium. The computer readable medium can contain instructions that, when executed by the at least one processor, cause the system to perform operations. The operations can include receiving, from a user device, a request to authenticate a user. The operations can further include generating an authentication question based on stored object data, the stored object data being generated based on image data depicting an object, the authentication question relating to at least one of a type of the object, a location where the image data was acquired, or a time when the image data was acquired, the image data being acquired by an image sensor of an augmented reality device associated with the user. The operations can include providing the authentication question to the user device. The operations can further include receiving an authentication response from the user device. The operations can additionally include determining whether to authenticate the user based at least in part on the authentication response.

The disclosed embodiments include an augmented reality system. The augmented reality system can include an image sensor a memory storing instructions, and at least one processor configured to execute the instructions to perform operations. The operations can include acquiring image data using the image sensor. The operations can further include detecting an object in the image data. The operations can additionally include determining that the object satisfies a user perception criterion. The operations can further include authenticating, using user information, the augmented reality system to an authentication system. The operations can also include supplying object data to the authentication system, wherein: the object data includes at least one of a time when the image data was acquired, a location where the image data was acquired, or a type of the detected object, and the object data is sufficient for authentication of a user using an authentication question generated based on the object data.

The disclosed embodiments include a system. The system can include an augmented reality system configured to acquire image data depicting an object, detect the object in the image data, and provide object data for the object to an authentication system. The authentication system can be configured to receive and store the object data, receive an authentication request from a user, and generate an authentication question using the stored object data, the authentication question relating to at least one of a type of the object, a location where the image data was acquired, or a time when the image data was acquired, The system can further include a user device configured to provide the authentication request to the authentication system, receive the authentication question from the authentication system, and provide an authentication response to the authentication system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
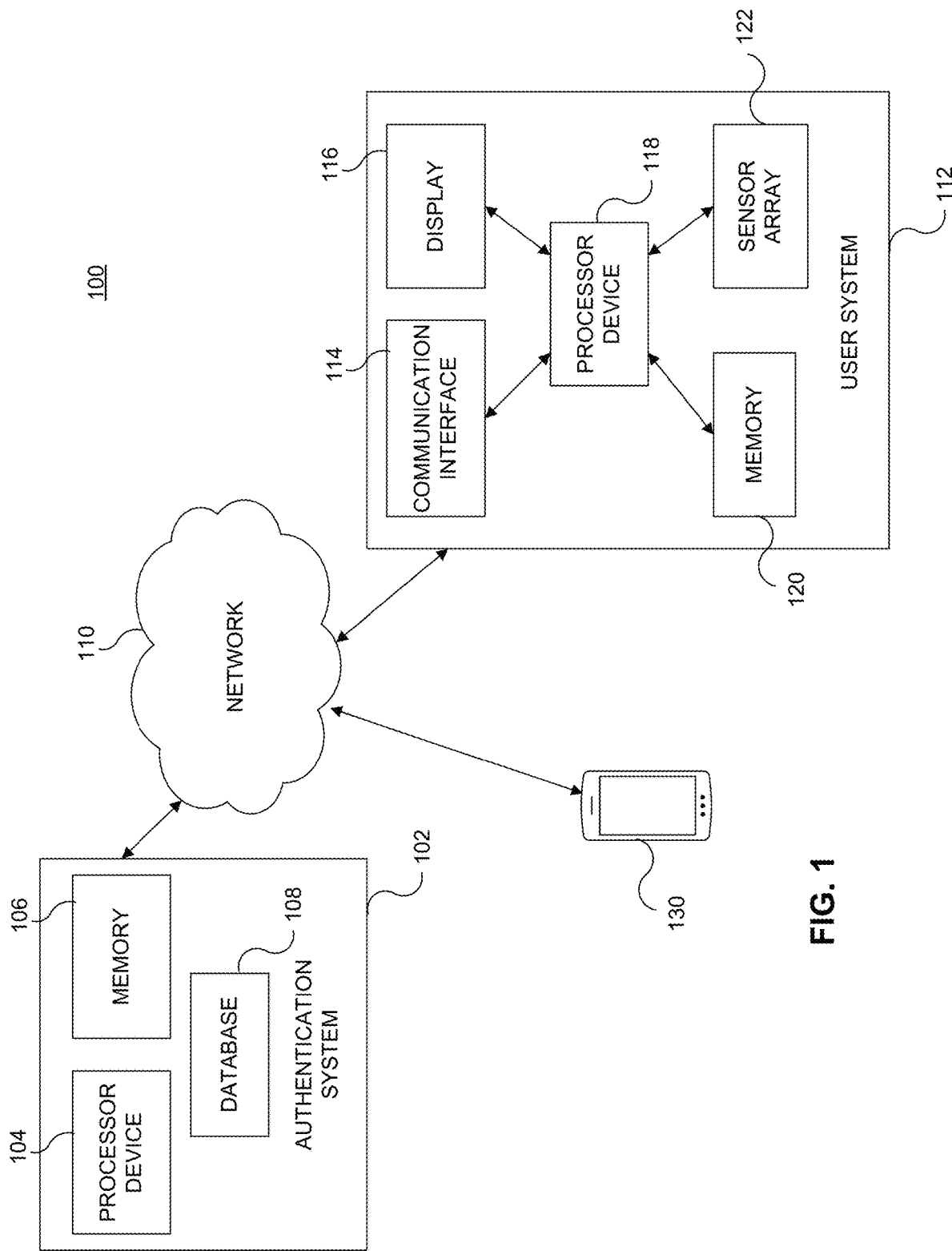
FIG. 1 illustrates an exemplary system for knowledge-based authentication, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

Authentication systems may require that an entity provide evidence of identity before allowing access to a resource. Such evidence may include information that would likely be known only by the user (e.g., a password, PIN, predetermined answer to an authentication question, etc.). Some authentication systems require configuration before they can accept evidence of identity. For example, an authentication system may require that a user provide a password, PIN number, or answer to an authentication question during an enrollment phase. The password, PIN number, or answer (or a hash or other function thereof) may be compared to input provided by the user (or a hash or other function thereof) during an authentication phase, to determine whether the entity is the user.

However, such conventional approaches impose burdens on the user. The user must perform the separate enrollment phase and must remember the information (e.g., password, PIN number, or answer) provided during the enrollment phase. To forego the hassle of enrollment, users may choose not to enroll in the authentication system, exposing them to impersonation by malicious actors. Users that enroll and then forget the information provided during enrollment may become frustrated and stop attempting to access the resource altogether or may repeatedly use re-authentication functionality (e.g., password resetting functionality) to access the resource. All of these outcomes clearly diminish the user experience.

The disclosed embodiments can authenticate a user by use of information captured by an augmented reality system (AR system) associated with the user. The information can be captured during normal operation of the AR system. The AR system can provide the information to the authentication system. The authentication system can use this information to later authenticate the user, when the user attempts to access a resource. This attempt need not involve the AR system; instead, the AR system may simply collect the information used for authentication. As a non-limiting example, the AR system can identify an object in an acquired image. Object data for the object can be provided to the authentication system, which can use the object data to generate one or more authentication questions for the user. In this manner, the disclosed embodiments may allow the user to avoid participating in an enrollment phase, reducing the burden of authentication on the user.

In some embodiments, the AR system can automatically provide the information to the authentication system, further relieving the user of the burden of interacting with the authentication system. In some embodiments, the AR system can provide numerous items of information to the authentication system, thereby increasing options for authentication. For example, an authentication system may be able to generate a sufficiently large number of authentication questions to authenticate a user based on the number or proportion of questions answered correctly, rather than requiring each of a smaller number of questions to be correctly answered.

The AR system can automatically select information based on the memorability or salience of that information, in some embodiments. In this manner, the disclosed embodiments can reduce the burden on the user to remember the information. In some embodiments, the AR system can provide feedback enhancing the memorability or salience of the information. For example, when the AR system provides to the authentication system data relating to an object, the AR system can also provide a visual or auditory emphasis of the object. The provided emphasis can potentially alert the user that this object may be used for future authentication, increasing the memorability or salience of the object.

Accordingly, the disclosed embodiments provide an improved authentication system that reduces the burden of authentication on the user. The disclosed embodiments may be used in multi-factor authentication systems. In such systems, the disclosed embodiments can be used to generate one of the pieces of evidence used to authenticate an entity as the user (e.g., in combination with something the entity possesses or something the entity is). For example, the disclosed authentication questions may be provided after a user has entered a username and password, as an additional layer of authentication. However, the disclosed embodiments are not limited to multi-factor authentication use cases, and may be used to provide stand-alone authentication in some embodiments.

FIG. 1 illustrates an exemplary system 100 for knowledge-based authentication. In one aspect, system 100 may include an authentication system 102, a user system 112, a user device 130, and network 110. It should be noted that although a single user device 130 is shown in FIG. 1, more than one user device 130 may exist in system 100. Furthermore, although a single authentication system 102 is shown in FIG. 1, more than one authentication system 102 (e.g. a second or third system) may exist in system 100.

Authentication system 102 may be a system configured to provide authentication services. As a non-limiting example, authentication system 102 can be configured to receive authentication requests from user devices (e.g., user device 130). Authentication system 102 can be configured to interact with the user devices to authenticate users. In response to a successful authentication, authentication system 102 can provide to user device 130 an access token, signing key, or the like that can be used to access a resource. The resource can be hosted by authentication system 102 or another computing system, such as a resource server. In some embodiments, authentication system 102 can be an authentication source in a decentralized authentication system such as OATH or a client-server authentication system such as Kerberos. It is to be understood that the disclosed embodiments are not limited to any particular authentication system or protocol.

Authentication system 102 may include components that perform processes consistent with the disclosed embodiments. For example, authentication system 102 may include one or more computers, e.g., processor device 104, a CPU, and/or other hardware-based applications processing devices, configured to execute software instructions programmed to perform aspects of the disclosed embodiments. Such software instructions may be stored, for example, in a memory 106 and/or a database 108 and, when executed, may store information used to service authentication requests (e.g., object data, authentication questions, user information, or the like), or perform any other relevant function. In one aspect, database 108 may be co-located with authentication system 102. Alternatively, database 108 may be located remotely from the authentication system 102. Database 108 may include computing components (e.g., database management system, database server, etc.) configured to receive and process requests for data stored in memory 106 and to provide data from database 108. Database 108 may include database systems, such as database storage devices, including one or more database processing devices configured to receive instructions to access, process, and send information stored in the storage devices. By way of example, such database systems may include Oracle™ databases, Sybase™ databases, or other relational databases or non-relational databases, such as Hadoop sequence files, HBase, or Cassandra.

User system 112 may include a system associated with a user (e.g., a consumer, field technician, equipment operator, or any other individual that may benefit from received AR content). User system 112 can be configured to perform operations consistent with the disclosed embodiments. In some embodiments, a user may operate user system 112 to perform one or more such operations. User system 112 may include a communication interface 114, a processor device 118, a memory 120, a sensor array 122, a display 116, and/or any other components that may facilitate the display of AR content to the user. The processor device 118 may be configured to execute software instructions to perform aspects of the disclosed embodiments. User system 112 may be configured in the form of an AR device, such as a head mounted display (HMD). Although in the present disclosure user system 112 is described in connection with a HMD, user system 112 may include tablet devices, mobile phone (s), laptop computers, a wearable device, such as a smart watch, and any other computing device(s) known to those skilled in the art.

Communication interface 114 may include one or more communication components, such as cellular, WiFi, Bluetooth transceivers, or any other wireless transceivers or communication equipment. Communication interface 114 may package and send data or instructions across network 110 to authentication system 102. Communication interface 114 may also handle data or instructions received across network 110 from authentication system 102. Processor device 118 may access and use information received via communication interface 114.

Display 116 may include any suitable display for providing AR content to a user. For example, in some embodiments, display 116 may include one or more translucent, transparent, or semi-transparent components configured to pass at least some light from a scene to the eyes of a user. Display 116 may also include opaque lenses or components, e.g., where the images seen by the user are computer-generated, constitute light-guided projections of real-world objects, or include images captured by one or more cameras (or other image sensors) associated with user system 112. In such embodiments, generated, captured, and/or light-guided images of real-world objects may be projected onto opaque or semi-opaque components associated with display 116. Display 116 may also project information using holographic images.

Sensor array 122 may include any type of sensor configured to provide an output signal useful in providing AR content to a user. In some embodiments, sensor array 122 may include one or more GPS sensors, cameras, barometric sensors, proximity sensors, physiological monitoring sensors, chemical sensors, magnetometers, gyroscopes, accelerometers, bar code scanners, motion detectors, image sensors, depth sensors, eye tracking sensors, iris scanners, etc.

Processor devices 104 and 118 may include one or more suitable hardware-based processing devices, such as a microprocessor, controller, central processing unit, programmable gate array, etc. that can execute software-based instructions. In some embodiments, processor devices 104 and/or 118 may include a microprocessor from the OMAP family manufactured by Texas Instruments, the Snapdragon™ family manufactured by Qualcomm™, or any of various types of processor devices manufactured by other microprocessor manufacturers.

Consistent with disclosed embodiments, components of system 100, including authentication system 102 and user system 112, may also include one or more memory devices (such as memories 106 and 120) as shown in exemplary form in FIG. 1. The memory devices may include magnetic storage units, optical storage units, RAM, ROM, hard drives, flash memory, etc. Such memory devices may be located together with authentication system 102 and/or user system 112 or may be located remotely with respect to either or both systems. Memory 106 and or 120 may store software instructions that are executed by processor devices 104 and 118 as applications, network communication processes, operating system software, software instructions relating to the disclosed embodiments, and any other type of application or software known to be executable by processing devices. The memory devices may be a volatile or non-volatile, magnetic, semiconductor, tape, optical, removable, non-removable, or other type of storage device or non-transitory computer-readable medium. The memory devices may be two or more memory devices distributed over a local or wide area network, or may be a single memory device.

In some embodiments, authentication system 102 and user system 112 may also include additional components (not shown) that provide communications with other components of system 100, such as through network 110, or any other suitable communications infrastructure.

Network 110 may be any type of network that facilitates communications and data transfer between components of system 100, such as, for example, authentication system 102 and user system 112. Network 110 may be a Local Area Network (LAN), a Wide Area Network (WAN), such as the Internet, and may include a single network or a combination of networks. Further, network 110 may include a single type of network or a combination of different types of networks, such as the Internet and public exchange networks for wireline and/or wireless communications. Network 110 may utilize cloud computing technologies that are familiar in the marketplace. Network 110 is not limited to the above examples, and system 100 may implement any type of network that allows the entities (and others not shown) included in FIG. 1 to exchange data and/or information.

User device 130 can be a computing device configured to enable the user to access a resource over network 110. For example, user device 130 can be a wearable device (e.g., a smartwatch, AR headset, or the like), a mobile device (e.g., a mobile phone, tablet, laptop, or the like), desktop, laptop, workstation, terminal, or other computing device. The resource being accessed can be a database, service, application, machine, or the like that provides desired information or functionality to the user. The disclosed embodiments are not limited to any particular type or implementation of resources. The resource can be hosted by authentication system 102, user device 130, user system 112, or another system (not depicted in FIG. 1). A user can interact with user device 130 (e.g., through a user interface) to attempt to access the resource. The user device can be directed, or re-directed, to authentication system 102. Upon successful authentication, authentication system 102 can enable user device 130 to access the resource (e.g., by providing an access token, signing key, or the like).

Figure 2:
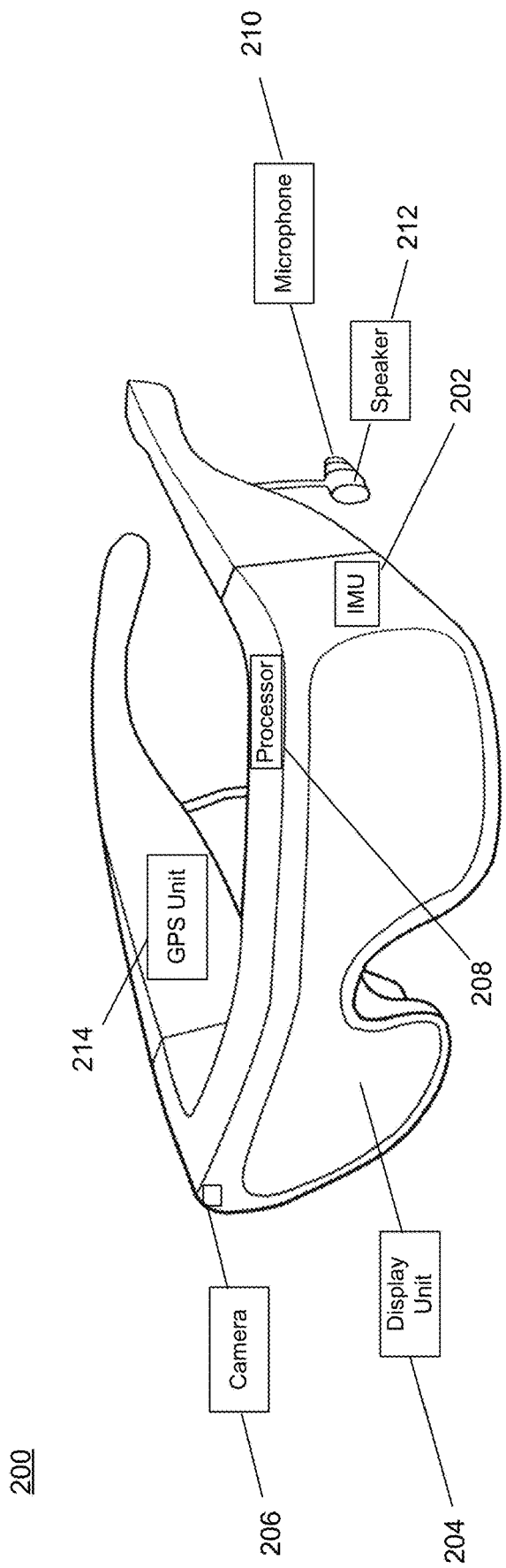
FIG. 2 illustrates an exemplary AR device suitable for use in the authentication system of FIG. 1, consistent with disclosed embodiments.

FIG. 2 illustrates an exemplary AR device 200 suitable for use in the authentication system of FIG. 1. At present, augmented reality glasses are the most common type of AR device. It is also possible to use a smart phone or camera as an AR device. Therefore, it will be understood that the disclosed embodiments are not limited to AR glasses or any one type of AR device. For example, a relatively simple AR device might involve a camera interacting with the surrounding environment and projecting virtual objects/menus on a viewfinder, on top of images of real-world objects.

As shown in FIG. 2, AR device 200 may include features relating to navigation, orientation, location, sensory input, sensory output, communication, and computing. For example, AR device 200 may include an inertial measurement unit (IMU) 202. IMU 202 may include axial accelerometers or gyroscopes for measuring position, velocity, and orientation. IMUs 202 may enable determination of the position, velocity, and/or orientation of AR device 200 within the surrounding real-world environment and/or its position, velocity, and orientation relative to real-world objects within that environment in order to perform its various functions.

AR device 200 may also include a Global Positioning System (GPS) unit 214. GPS units receive signals transmitted by a plurality of geosynchronous earth orbiting satellites in order to determine the location of the GPS unit. In more sophisticated systems, the GPS unit may repeatedly forward a location signal to an IMU to supplement the IMU's ability to compute position and velocity, thereby improving the accuracy of the IMU. In the present case, AR device 200 may employ GPS 214 to identify a location of AR device 200. In some embodiments, AR device 200 may determine the user's presence and/or location using other devices in an environment of the user of AR device 200 (e.g., AR device 200 may communicate with, for example, Bluetooth low-energy beacons).

As mentioned above, AR device 200 may include a number of features relating to sensory input and sensory output. AR device 200 may include a front-facing camera 206 to provide visual (e.g., video) input, a display (e.g., a translucent or a stereoscopic translucent display) 204 to provide a medium for displaying computer-generated information to the user, a microphone 210 to provide sound input, and audio buds/speakers 212 to provide sound output. In some embodiments, the visually conveyed digital data may be received by AR device 200 through the front-facing camera 206. In some embodiments, AR device 200 may include one or more eye tracking sensors that may be configured to monitor and/or track a viewing direction of a user, based on the position of one or both of the user's eyes, and provide an output relating to the viewing direction of the user (e.g., a direction of the user's glance).

AR device 200 may also have communication capabilities, similar to other mobile devices, through the use of a cellular, WiFi, Bluetooth or tethered Ethernet connection. AR device 200 may also include an on-board processor, such as microprocessor 208. Microprocessor 208 may control the aforementioned and other features associated with AR device 200.

In one exemplary embodiment, AR device 200 may include see-through display and sensor systems that provide the device's location, orientation, and bearing (for example, latitude, longitude, altitude, pitch, roll or degree tilt from horizontal and vertical axes, and compass heading). AR device 200 may be configured as glasses that can be worn by a person. Further, one or more elements of the sensor system may be located on peripheral devices physically separate from the display.

Additionally, in this embodiment, AR device 200 may rely on a computer software application to instruct the glasses to render virtual objects on the display field of view. Virtual objects include, but are not limited to, text, images, models, and icons. The user may view or interact with virtual objects using hardware and software associated with the AR device 200.

Figure 3:
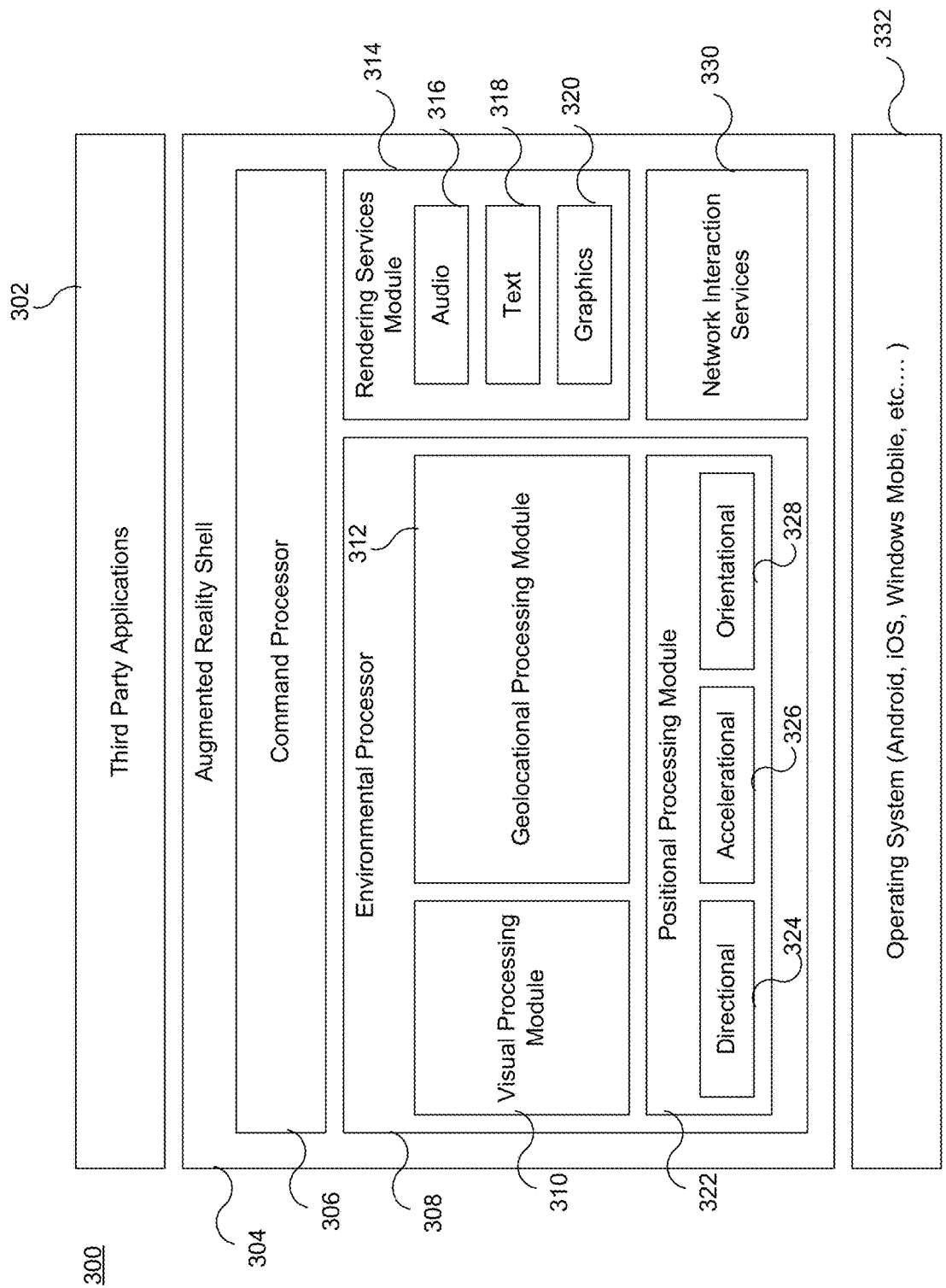
FIG. 3 is a block diagram illustrating a software-driven system for processing digital data, consistent with disclosed embodiments.

FIG. 3 is a system block diagram illustrating a software-driven system 300 for processing digital data, associated with an AR device consistent with exemplary disclosed embodiments. As illustrated, system 300 may be configured into three layers. At the lowest layer is the augmented reality device operating system 332. Operating system 332 may be, for example, an Android-based operating system, an Apple IOS-based operating system, a Windows Mobile operating system or the like. At the highest layer may reside a third-party applications layer 302. Applications that are designed to work with the operating system 332 and to reside in this third layer are either supplied with the AR device or may loaded by the user after initial acquisition of the AR device.

The middle layer of system 300 is referred to as the augmented reality shell 304. Augmented reality shell 304, as shown, includes a number of components including a command processor 306, an environmental processor 308, a rendering services module 314, and a network interaction services module 330. It should be understood that each of the functional modules and/or components may consist of hardware, software, firmware or a combination thereof.

Environmental processor 308, in general, monitors the surrounding real-world environment of the AR device (e.g., AR device 200) based on input signals received and processed by the AR device (e.g., from sensor array 122). Environmental processor 308 may be implemented, as shown in FIG. 3, similar to the other processing components, or it may be implemented separately, for example, in the form of an application specific integrated chip (ASIC). In some embodiments, the environmental processor 68 may be configured to operate whenever the AR device is powered on.

Environmental processor 308, in turn, may also include several processing modules: a visual processing module 310, a geolocational processing module 312, and a positional processing module 322. Visual processing module 310 is primarily responsible for detecting and decoding frames of video data, and processing the digital data included with the video data that was visually conveyed to the AR device.

Geolocational processing module 312 may receive and process signals relating to the location of the AR device. The signals may, for example, relate to GPS coordinates, the location of a WiFi hotspot, proximity to a local cell tower, or proximity to other devices (e.g., Bluetooth low-energy beacons).

Positional processing module 322 may receive and process signals relating to the position, velocity, acceleration, direction, and orientation of the AR device. Positional processing module 322 may include a directional module 324, an acceleration module 326, and an orientation module 328. Positional processing module 322 may receive these signals from an IMU (e.g., IMU 202). Positional processing module 322 may, alternatively or additionally, receive signals from a GPS receiver, where it is understood that the GPS receiver can only approximate a position (and therefore velocity and acceleration) and where positional processing module 322 can then provide a level of detail or accuracy based on the GPS-approximated position. Thus, for example, the GPS receiver may be able to provide the general geographic coordinates of a movie theater, but positional processing module 322 may be able to provide the user's orientation within the movie theater. Positional processing module 322 may be employed in conjunction with visual processing module 310 to synchronize user head movements with viewing experiences (e.g., what rendering services module 314 will present on the display and, therefore, what the user sees).

Command processor 306 may process messaging data between the modules and/or components. For example, after visual processing module 310 processes the video data, visual processing module 310 communicates with command processor 306 which, in turn, generates one or more commands to rendering services module 314 to produce the computer-generated data (e.g., text, graphics, additional video, sound) that will be used to supplement the video images and enhance the user's viewing experience.

Rendering services module 314 may process the content of the digital data that was optically received and, based on instructions provided through command processor 306, generate and present (e.g., display) data in the form of sound, graphics/animation, text, additional video, and the like. The user can thus view the video images and, in addition, experience the computer-generated information to supplement the video images and enhance the viewing experience. Rendering services module 314 may include an audio module 316, a text module 318, and a graphics module 320.

In some embodiments, the software applications associated with AR device 200 may create and maintain coordinate systems that correspond to the position and orientation of AR device 200, the field of view of AR device 200, and the virtual content. These coordinate systems may correspond to locations in the real physical world or may be referenced with respect to AR device 200 or to any other suitable reference. The maintained coordinate systems may include a two-dimensional Cartesian coordinate system, a three-dimensional Cartesian coordinate system, a two-dimensional spherical coordinate system, a three-dimensional spherical coordinate system, or any other suitable coordinate system.

In other embodiments, AR content may also be repositioned and accessed by the user. For example, the user may turn his head in the direction of repositioned AR content and, based on the sensed motion of the head, the rendering of the AR content may be updated relative to the motion of the user's head. As another example, one or more eye-tracking sensors may be configured to track a viewing direction of the user, such as the user's glance direction, and the rendering of the AR content may be updated relative to changes in the user's glance direction. In some embodiments, the rendered AR content may appear to the user as fixed at the repositioned location, and the user may turn his head in the direction of the repositioned location in order to bring the AR content toward and into the center of the field of view of display 116. Subsequent turning of the head away from the repositioned location will cause the rendered AR content on the display to move away from the center of the field of view. In this way, the user may move the desired AR content to a virtual location that does not impede viewing of objects in the center of the field of view, but that still allows access to the desired AR content, for example, by turning toward the virtual position of that content.

As will be appreciated by a person skilled in the art having the benefit of this disclosure, numerous variations and/or modifications may be made to the foregoing disclosed embodiments. For example, not all components are essential for the operation of AR device 200. Further, any component may be located in any appropriate part of AR device 200 and the components may be rearranged into a variety of configurations while providing the functionality of the disclosed embodiments. Therefore, the foregoing configurations are examples and, regardless of the configurations discussed above, AR device 200 can provide various features that allow a user to interact and/or control AR device 200. Further details regarding various features provided by AR device 200 are discussed below in further detail.

Figure 4:
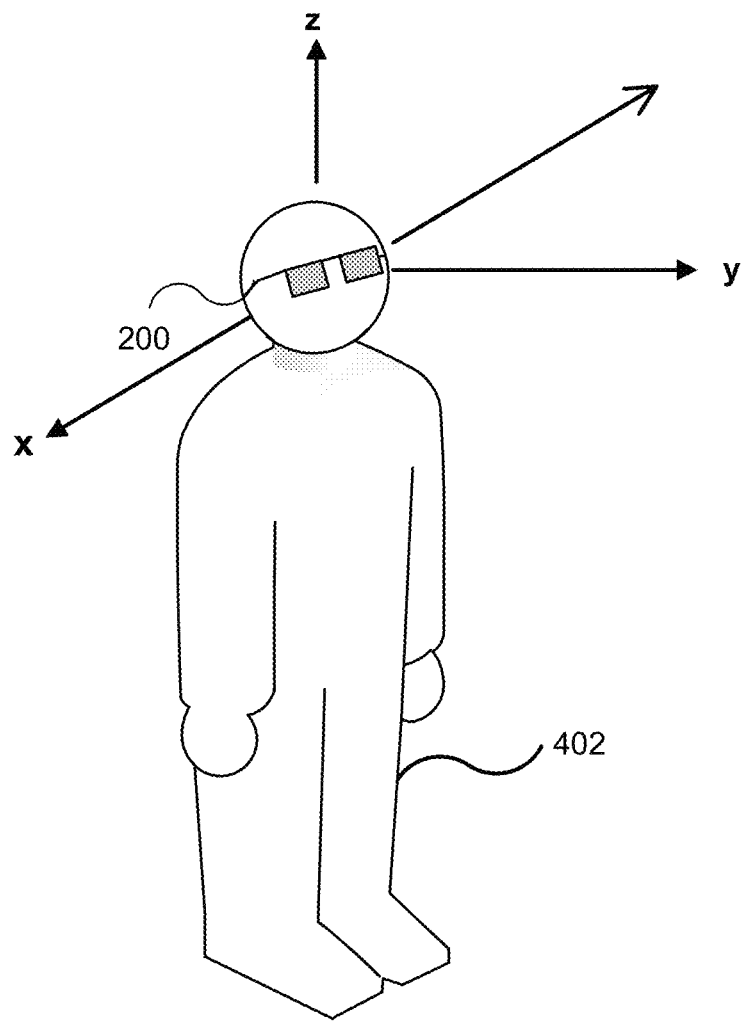
FIG. 4 illustrates an example of a user wearing an AR device, consistent with disclosed embodiments.

FIG. 4 illustrates an example of a user 402 wearing AR device 200, consistent with disclosed embodiments. As shown in FIG. 4, user 402 is in an environment 400 and is wearing AR device 200, as discussed above regarding FIG. 2. AR device 200 may include a frame configured to secure the device to the head of user 402. As discussed above, AR device 200 may include sensor array 122 (not shown in FIG. 4). Sensor array 122 may include one or more sensors configured to detect a viewing direction of the user. In some embodiments, the sensors may detect a viewing direction of the user by detecting the orientation of the head of user 402 by detecting the orientation of AR device 200. The sensors may include any one or more of a motion detector (e.g., a gyroscope and/or an accelerometer), a camera, a location determination device (e.g., a GPS device, an NFC reader), a magnetometer, and/or an orientation sensor (e.g., a theodolite, infra-red sensor). Such sensors may include magnetometers (compasses) to detect orientation or a direction that a user is looking, accelerometers (e.g., three-axis accelerometers) to detect the direction and speed of movements associated with AR device, or the like. For example, the orientation of the head of user 402 may be defined according to a coordinate system, such as a three-dimensional coordinate system (x, y, z) having the origin at a point on AR device 200, such as a central point of display 204, the position at which IMU 202 is located, or any other reference point on AR device 200. In other embodiments, an eye-tracking sensor may be configured to track a viewing direction of the user by tracking and/or monitoring the eyes of the user to determine the user's glance direction.

In some embodiments, positional processing module 322 (FIG. 3) may be configured to store instructions that, when executed by a processing device (e.g., microprocessor 208) of AR device 200, determine the orientation of the head of user 402 based on output from the sensors.

In some embodiments, sensors may be configured to detect the orientation of the head of user 402 periodically. For example, sensors may be configured to detect the origination of the head of user 402 at any suitable time interval (e.g., every second, multiple times per second (2, 4, 6, 10 or more times per second), or once over the course of multiple seconds, etc.). Further, the sensors may be configured to output a detected angle of AR device 200 to a processing device (e.g., microprocessor 208). Alternatively, the sensors may be configured to output the detected coordinates of predetermined reference points of AR device 200 with reference to a predetermined coordinate system. For example, the sensors may be configured to detect coordinates of multiple points of display 204 in a predetermined three-dimensional coordinate system having an origin set as the central point of AR device 200.

Figure 5:
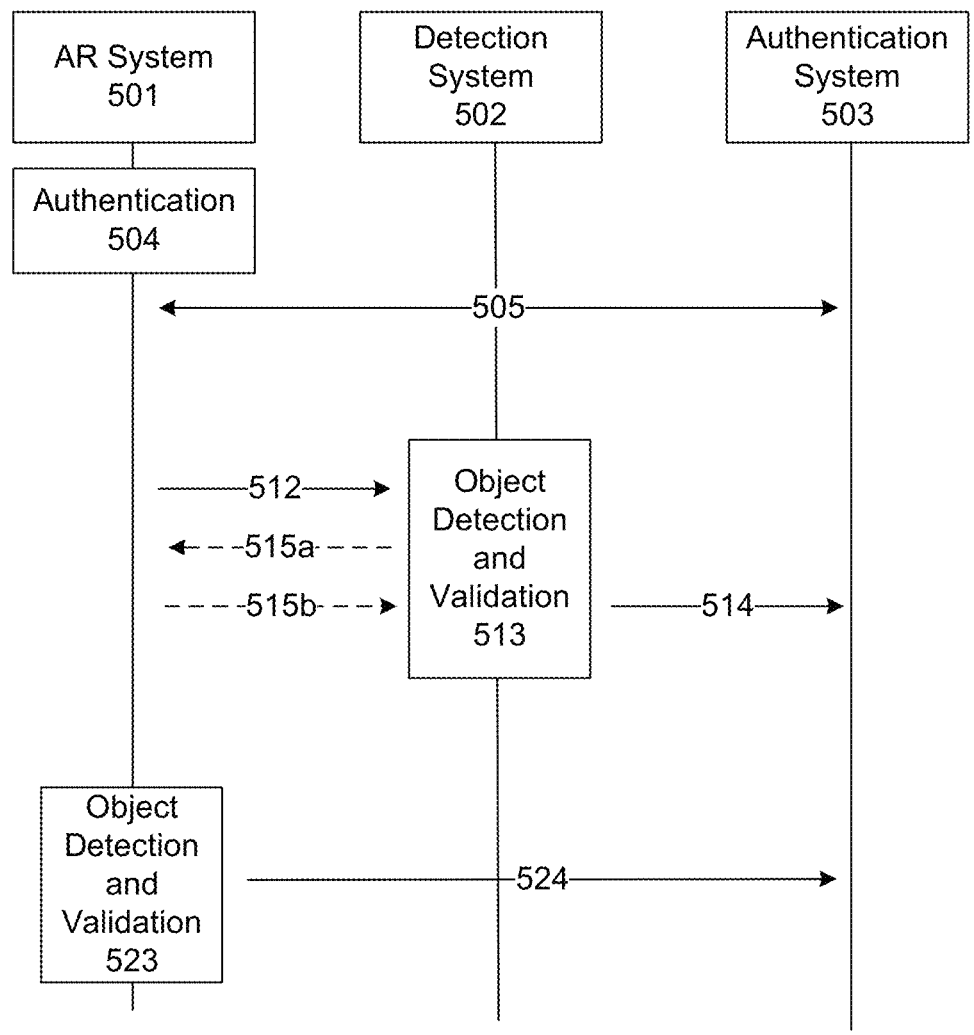
FIG. 5 illustrates two exemplary methods of provisioning an authentication system with information for performance of knowledge-based authentication, consistent with disclosed embodiments.

FIG. 5 illustrates an exemplary method 500 of provisioning an authentication system with information for performance of knowledge-based authentication, consistent with disclosed embodiments. Method 500 can include authentication of a user to an AR system, configuration of the AR system to provide object data to an authentication system. The AR system can then detect and validate objects in image data acquired by the AR system. In some embodiments, the AR system may display an indication of a detected object and receive a user acknowledge of the provided indication. The AR system can then provide the object data to the authentication system. In this manner, object data relating to objects likely viewed by the user may be provided to the authentication server. The authentication server may use this object data to generate authentication questions, without necessarily requiring the user to manually provide authentication questions and answers. Because, in some embodiments, the authentication system may generate authentication questions using recently acquired object data, the authentication questions may be easier for the user to answer than authentication questions created during some past enrollment session. Method 500 can therefore improve the user's authentication experience. In addition, authentication using recently acquired object data may be less susceptible to compromise than authentication using predetermined knowledge-based authentication questions. For example, malicious actors may intercept responses to predetermined questions and replay these responses in a subsequent attack. As an additional example, knowledge-based authentication questions that use personal information (e.g., birthday, childhood street address, maiden name, or the like) may be vulnerable to attacks by malicious actors who have researched the target. Method 500 can therefore also improve the user's security.

In step 511, the user may be authenticated to an AR system, consistent with disclosed embodiments. The disclosed embodiments are not limited to a particular method of performing such authentication. As non-limiting example, the user may be authenticated using biometrics, such as facial recognition, retinal scanning, iris scanning, voice recognition, or the like. As a further non-limiting example, the user may be authenticated using a password, pass phrase, authentication dongle, or the like. During authentication, user information for the user can be determined. For example, the user information may be provided by the user (e.g., a password, or the like) or retrieved based on information provided by the user (e.g., retrieved based on a biometric identification or the presence of an authentication dongle). The user information may include credential information (e.g., username and password, access token, key associated with the AR system or the authentication system, digital signature using such a key, or the like), other identifying information (e.g., account information, device information, or the like), or the like.

In step 512, the AR system may be configured to provide object data to the authentication system. In some embodiments, such configuration may include authenticating the AR system to the authentication system. The disclosed embodiments are not limited to a particular method of authenticating the AR system to the authentication system. As a non-limiting example, such authentication may include providing, by the AR system to the authentication system, user information, as described herein. The authentication system may use the user information to authenticate the AR system. As a further non-limiting example, such authentication may include provisioning the AR system with a key to use in subsequent interactions with the authenticating system (e.g., an API signing key, as used in OAuth or the like).

In some embodiments, such configuration may include creating an association between the AR system and the authentication system. The association between the AR system and the authentication system may be expressed in any manner that permits data or instructions received by the authentication system from the AR system to be associated with the AR system, and that permits data or instructions received by the AR system from the authentication system to be associated with the authentication system. As a non-limiting example, user information, as described herein, may be used to label data or instructions received by the authentication system from the AR system, or received by the AR system form the authentication system. The association between the AR system and the authentication system may further be associated the user with the authentication system. In some instances, user information used to label data or instructions received by the authentication system can indicate the user. For example, the authentication system can be configured to associate the AR system with the account of a user. When object data is received from the AR system, the authentication system can associate the object data with the account of the user and store the object data (e.g., in a database indexed by user account numbers or other identifying user information).

In some embodiments, the authentication system may require authentication of the AR system before creating an association between the AR system and the authentication system. In some embodiments, the authentication system may create the association without requiring authentication of the AR system.

In step 513, the AR system may obtain image data, consistent with disclosed embodiments. In some embodiments, the image data may be obtained using sensors disposed in the AR system, such as cameras. In some embodiments, obtaining the image data may include sampling a video stream, or the like. For example, the AR system may be acquiring video data and samples of the video data may be repeatedly obtained for use in method 500. In some embodiments, in addition to image data, the AR system may also be configured to obtain time or location information (e.g., from a GPS component or using mobile network triangulation).

In step 514, the AR system may perform object detection and validation, consistent with disclosed embodiments. The AR system may perform object detection on the obtained image data. Consistent with disclosed embodiments, the AR system may perform object detection using known machine-learning techniques. Such techniques may include, but are not limited to, those based on feature detection and classification (e.g., Viola-Jones object detection, Scale Invariant Feature Transforms, histograms of oriented gradients, or the like) and deep learning approaches (e.g., Region Proposals, Single Shot MultiBox Detector, You Only Look Once, Single-Shot Refinement Neural Network for Object Detection, Retina-Net, Deformable convolutional networks, or the like).

Consistent with disclosed embodiments, the AR system may perform object validation on detected objects. In some embodiments, object validation may include determining whether a detected object satisfies a user perception criterion. The user perception criterion may enable the AR system to distinguish objects that a user is likely to remember from objects that a user is unlikely to remember. The user perception criterion may be, or may include, a frequency criterion, a persistence criterion, a spatial position criterion, or optionally a display criterion or a user acknowledgement criterion. Satisfaction of the user perception criterion may require an object satisfying one or more applicable criterion (e.g., when the validation criterion includes a spatial position criterion, a persistence criterion, satisfaction of the user perception criterion may require the object satisfy the spatial position criterion and the persistence criterion, or may require the object satisfy either the spatial position criterion or the persistence criterion). In some embodiments, object may satisfy the user perception criterion when they satisfy the display criterion or user acknowledgement criterion, regardless of whether they satisfy other criteria.

Consistent with disclosed embodiments, a frequency criterion may be satisfied when a detected object appears in a certain number of images. For example, as disclosed herein, the AR system may repeatedly or periodically obtain image data. The AR system can be configured to match an object identified in a current image data with an object identified in previous image data. When the AR system determines that an object has appeared a certain number of times in obtained image data (or potentially a certain number of times within a certain period of time), the frequency criterion may be satisfied. For example, a user may be wearing the AR system as headset while sitting in an outdoor patio at a restaurant. As the user looks around, a car parked in front of the restaurant may repeatedly enter and leave the field of view of the AR system. The car may therefore repeatedly appear in image data obtained by the AR system. The AR system can detect the car in the image data, determine that the detected appearances represent the same car and, once the frequency criterion is satisfied, validate the car as a suitable object for knowledge-based authentication.

Consistent with disclosed embodiments, a persistence criterion may be satisfied when a detected object appears in the field of view of the AR system for a certain length of time. The length of time may be expressed as an elapsed time or a number of samples of image data. For example, when the length of time is 10 seconds and the AR system obtains image data every 2 seconds (e.g., every 2 seconds image data is sampled from a video stream for use in method 500), the persistence criterion may be satisfied when the car appears in five sequential images. Alternatively, when the sampling rate is not fixed, the AR system may associate each sample of image data with an acquisition time, and the persistence criterion may be satisfied when the car appears in sequential image data samples acquired more than 10 seconds apart (or a sequence of image data samples spanning more than 10 seconds).

Consistent with disclosed embodiments, a spatial position criterion may depend on where in the field of view the image appears (e.g., central or peripheral field of view). To continue the prior example, the car parked in front of the restaurant may appear in the periphery of the field of view of the AR system, if the user never looks directly at the car. In such an instance, the car may not satisfy the spatial position criterion.

In some embodiments, object validation may include anti-spoofing testing. Anti-spoofing testing can determine whether the object identified is a real-world object or a virtual object (e.g., an image of an object on a screen viewed by the user, or the like). Anti-spoofing testing depend on at least one of transition detection or motion comparisons. In some embodiments, anti-spoofing testing can include object recognition. For example, the AR system may recognize a television or movie screen in an image and may ignore or disregard particular objects displayed on the television or movie screen.

Consistent with disclosed embodiments, transition detection may include determining whether image data obtained by the AR system changes in a continuous, predictable fashion. For example, acquired images of real-world objects may change in a continuous, predictable fashion as the user changes the position and orientation of her head. In contrast, images displayed on a screen (e.g., movie, internet, or television images) may change discontinuously, as webpages load or a movie or television show cuts between viewpoints and locations. The AR system may be configured to determine whether a degree of change in acquired image data exceeds a predetermined threshold. When the degree of change exceeds the predetermined threshold, the AR system may determine that the image data does not depict a real-world object.

Consistent with disclosed embodiments, motion detection may include determining whether motion of objects in the acquired image data is consistent with motion of the AR system. As described herein, the AR system may be configured to acquire motion information using an IMU, accelerometer, GPS system, or the like. The AR system may be configured to determine a system motion of an AR system (e.g., user system 112, AR device 200, or the like) using the acquired motion information. The AR system may be configured to determine an object motion of the detected object using the acquired image data. The AR system may compare the object motion to the system motion to determine a discrepancy between the object motion and the system motion. Based on the comparison, the AR system may determine whether the object is a real-world object or an image of an object. For example, a display angle of the object may be determined from the acquired image data. When this display angle changes, without a corresponding change in the angle of the AR system, the discrepancy between the change in the display angle and lack of a corresponding change in the angle of the AR system may cause the AR system to determine that the object is not a real-world object. Similarly, when the acquired image data indicates motion of the AR system that is inconsistent with the determined system motion, the AR system may determine that objects in the acquired image data are not real-world objects. In some embodiments, the AR system may not validate objects that are not real-world objects for use in knowledge-based authentication.

Consistent with disclosed embodiments, in optional step 515 the AR system may provide an indication of the detection of the object to satisfy the display criterion. Providing such an indication may include displaying information on a display of the AR system to the user. Exemplary indications of the detection of the object are disclosed below with regards to FIG. 7. In some embodiments, in optional step 516, the AR system may receive a user acknowledgement of the detection indication provided in optional step 515, satisfying the user acknowledgement criterion. The user acknowledgement may indicate that the user performed a motion acknowledging the displayed visual indication, such as a motion of the user's eyes (e.g., looking at the object for a certain period of time, focusing on the object, or the like), a motion of the user's head (e.g., nodding, or the like), a motion of the user's body (e.g., a hand gesture, or the like), interaction with a user interface of AR system 501, or the like. The user acknowledgement may indicate that the users made an auditory acknowledgement of the displayed visual indication (e.g., stating "Okay" or "See it"). The AR system may determine that the object satisfies the user perception criterion based only on the provision of the indication, or based on provision of the indication and receipt of the user acknowledgement.

In step 517, the AR system may provide object data (which may include location information, time information, information describing the object, the image of the object itself, or the like) to the authentication system. The disclosed embodiments are not limited to a particular format or protocol for providing the object data. The authentication system may be configured to associate the received object data with the user, for example using the association established in step 512.

In some embodiments, a detection system may interact with the AR system to detect and validate the object. In such embodiments, configuring the AR system to provide object data may include authenticating the AR system to the detection system. The AR system may be authenticated to the detection system in a manner similar to the authentication of the AR system to the authentication system described above with regards to step 512. Furthermore, in such embodiments, configuring the AR system to provide object data may include authenticating the detection system to the authentication system. The AR system may be authenticated to the detection system in a manner similar to the authentication of the AR system to the authentication system described above with regards to step 512.

The detection system may be local to the AR system (e.g., a wearable device or mobile device of the user) or a remote server. When the detection system is local to the AR system (e.g., when the detection system is a mobile device of the user) associating the AR system with the detection system may include creating a wired or wireless communication link between the AR system and the detection system (e.g., a USB connection, Ethernet connection, WIFI connection, Bluetooth link, Zigbee link, or the like). When the detection system is remote from the AR system (e.g., when the detection system is a remote server or resource hosted on a cloud computing platform), associating the AR system with the detection system may include accessing an API exposed by the detection system.

In some embodiments including a detection system, the detection system may perform the object detection and validation in a manner similar to that described above with regards to step 514. The detection system may receive the image data from the AR system. The image data may be received through a wired or wireless connection between the AR system and the detection system. In some embodiments, the image data may be received using an API exposed by the detection system.

In embodiments where the detection system performs the object detection and validation, the detection system may provide instructions to the AR system to provide a detection indication (e.g., as described optional step 515), and may receive, from the AR system, an indication of a user acknowledgement (e.g., as described in optional step 516).

In embodiments where the detection system performs the object detection and validation, the detection system may provide the object data to the authentication system. Alternatively, the AR system may provide the object data to the authentication system.

Figure 6:
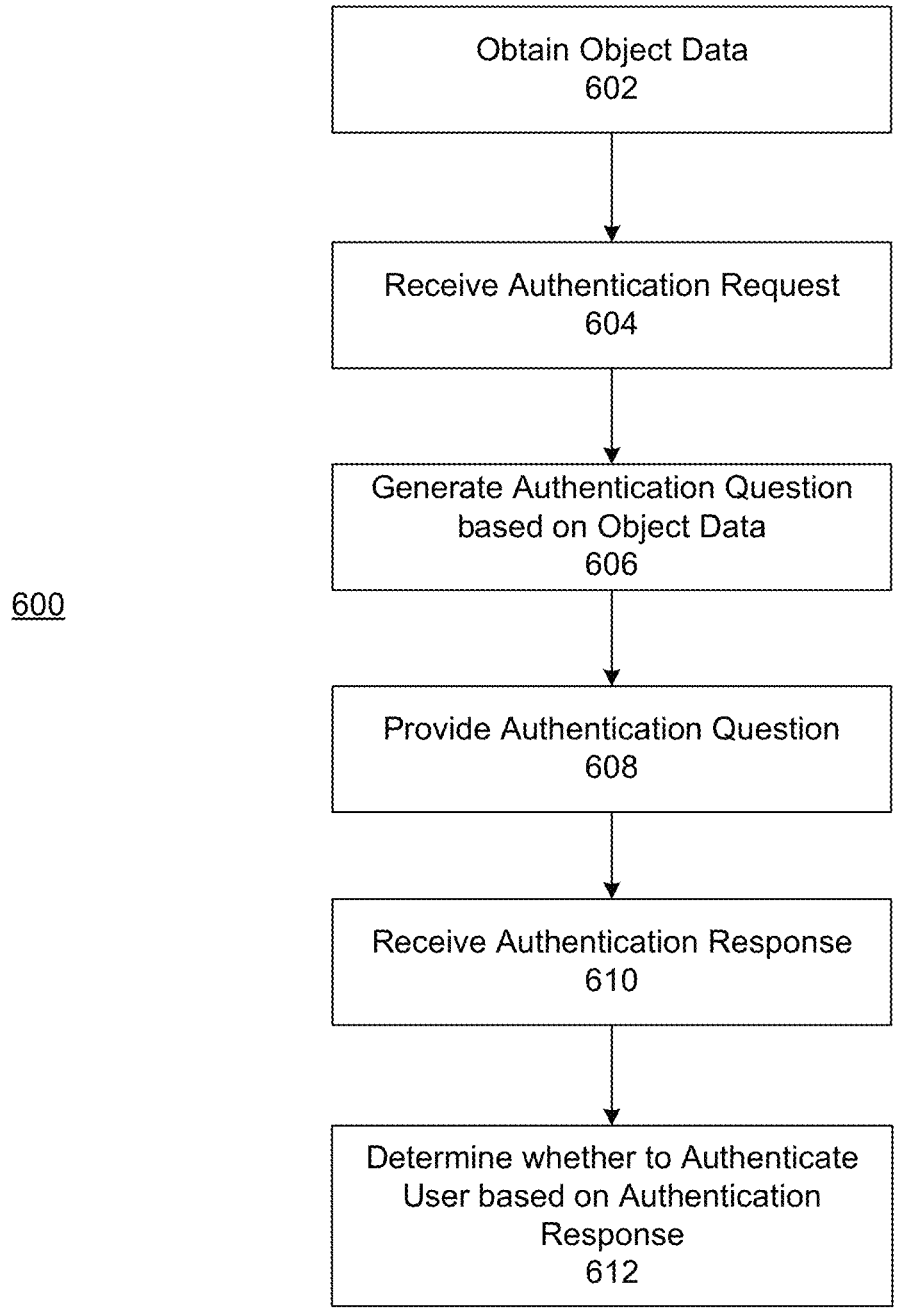
FIG. 6 illustrates an authentication process, consistent with disclosed embodiments.

FIG. 6 depicts an authentication process 600, consistent with disclosed embodiments. Authentication process 600 may include obtaining object data, receiving an authentication request from a user on a user device, generating an authentication question based on the authentication request, and using the authentication question to authenticate the user. The object data may be derived from image data acquired by an AR system associated with the user. Thus, the authentication question may concern information that the user likely knows but another person would not likely know. In this manner, the image data acquired by the AR system may be used for knowledge-based authentication of the user. The AR system may therefore be used to authenticate access attempts by the user using devices other than the AR system.

At step 602, an authentication system (e.g., authentication system 102, or the like) may obtain object data. Obtaining the object data may include retrieving or receiving the object data from an AR system or a detection system, as described above with regard to FIG. 5. Obtaining the object data may include generating the object data. For example, the authentication system may obtain image data from the AR system and perform object detection and validation as described above with regards to FIG. 5 on the obtained image data.

At step 604, the authentication system may receive an authentication request. The authentication request may be received directly or indirectly from a user device (e.g., user device 130). As a non-limiting example, the user may attempt to access a resource using the user device. The computing device hosting the resource may request authentication of the user from the authentication system, or may redirect the user device to the authentication system. The disclosed embodiments are not limited to a particular way to receive the request. As a non-limiting example, the authentication request may be received using a wired or wireless connection. For example, the authentication system may be configured to expose an API for receiving authentication requests. The authentication request may indicate a user. The disclosed embodiments are not limited to a particular way to indicate a user. As a non-limiting example, the authentication request may include a username, account number, device number associated with the user, or the like. In some exemplary multi-factor authentication implementations, the authentication request may occur before, during, or after another authentication step (e.g., entry of a username and password, or swiping of an authentication card in a card reader). The contents of the authentication request may, in some embodiments, depend on the prior authentication step. For example, the prior authentication step may have established the user to be authenticated (e.g., through the entry of a username).

At step 606 the authentication system may generate an authentication question. The authentication question may be based on the object data. In some embodiments, the authentication system may retrieve the object data in response to, and based upon, the indication of the user in the authentication request. For example, the authentication system may store object data corresponding to multiple differing users (e.g., in a database local or remote to the authentication system). The object data may be retrievable using the indication of the user. For example, in embodiments where the indication of the user includes a username or account number, the username or account number may be an index attribute or index field of a database storing the object data. The authentication system may query the database using the username or account number to retrieve one or more items of object data for the user. In some embodiments, the authentication system may impose an acquisition recency criterion on the object data for the user. For example, the authentication system may require that the object data was acquired within a certain period of time (e.g., within an hour, day, week, or another period of time). As an additional example, the authentication system may only retrieve the most recently acquired object data for the user. In some embodiments, when multiple items of object data are available for a user, the authentication system may randomly select one or more items of the object data.

At step 606, the authentication system may generate one or more authentication questions based on the obtained object data. When multiple items of object data are obtained, the authentication system may use them to generate multiple questions or may combine them to generate a single question (e.g., the authentication question "Select the animals you saw between 10 and 11 AM today" may be displayed together with multiple images of multiple detected objects). The authentication system may automatically generate the authentication questions. The authentication system may generate the authentication questions from the object data using a natural language generation component. The natural language generation component may include software, hardware, or combination of software and hardware. The natural language generation component may be configured to generate authentication questions from the object data.

In some embodiments, the natural language generation component can be configured to use rules and text templates to create questions from structured data. For example, the object data may include a classification of the object (e.g., a cat, a car, a man, or the like), a list of attributes of the object (e.g., type=car, color=red, make=Mazda, model=Miata, location_image_acquired={38°54′09.1″N, 77°02′24.9″W}, time_image_acquired=10:17:05 AM, etc.), or other structured data describing an object. In this non-limiting example, the natural language generation component may select a question template based on the type of the object being "car". A suitable exemplary template might be "What was the color of the [make] [model] you saw at [time] today?" with the answer being "red". Another suitable exemplary template might be "What was the make of the [color] [model] you saw at [time] today?" with the answer being "Miata". In some instances, the authentication system may determine the correct answer when the authentication question is generated. In various embodiments, the authentication system may generate a correct answer upon receipt of the authentication response.

In various embodiments, the natural language generation component may be configured to use one or more machine-learning algorithms to generate the authentication questions. For example, consistent with methods known in the art, the authentication questions may be generated from the object data. For example, a reinforcement learning algorithm, such as REINFORCE, a variational auto-encoder, or a generative adversarial network can be used to generate an authentication question based on the object data.

The disclosed embodiments are not limited to embodiments in which the authentication questions are generated in response to receipt of an authentication request. In some embodiments, the authentication questions may be generated after receipt of the object data and before receipt of the authentication request.

At step 608, the authentication system may provide instructions to the user device to present at least one of the authentication questions. Examples of providing such authentication questions are given in FIG. 8.

At step 610, the authentication system may receive an authentication response. The authentication response may include or indicate answers to the authentication questions displayed to the user. For example, when an authentication question includes a multiple-choice response or list of checkboxes, the authentication response may include an indication of the response(s) or checkbox(es) selected. As an additional example, when the authentication question includes textbox for entering a response, the authentication response may include text entered into the textbox.

At step 612, the authentication system may determine whether to authenticate the user based on the authentication response. In some embodiments, the authentication system may determine whether the authentication response matches the answer to an authentication question. When the authentication response indicates selection of response(s) to a multiple-choice question, the authentication system may determine whether the selected response(s) match the answer(s) to the multiple-choice question. When the response is an entry in a text field, a natural language processing component of the authentication system may perform semantic matching to determine whether the textual response matches the answer(s) to the authentication question. The natural language processing component may include software, hardware, or combination of software and hardware configured to determine the relevant semantic meaning of a text string. In some embodiments, the natural language processing component may determine matches using at least one of synonym matching (e.g., "automobile" matches "car"), stemming or lemmatization (e.g., "dogs" matches "dog"), ontologies (a "poodle" is a "dog" and so matches "dog"), or part-of-speech analysis. As a non-limiting example of part-of-speech analysis, the natural language processing component may determine that the phrase "big dog" includes an adjective followed by a noun. The natural language processing component may be configured to disregarding the adjective and determine that the noun matches the answer "dog". Similarly, the natural language processing component may determine that the phrase "Persian cat" includes a noun that matches an answer "cat". As would be appreciated by those of skill in the art, the above examples are exemplary and not intended to be limiting.

After determining whether the authentication response matches the answer to the authentication question, the authentication system may determine whether to authenticate the user. The authentication system may refuse to authenticate the user when the authentication response does not match the answer, in some embodiments (e.g., when only a limited number of authentication questions are provided). The authentication system may provide additional authentication questions when the authentication response does not match the answer, in some embodiments. The authentication system may authenticate the user when a sufficient number or proportion of authentication response match answers to provided authentication questions, in various embodiments.

Figure 7:
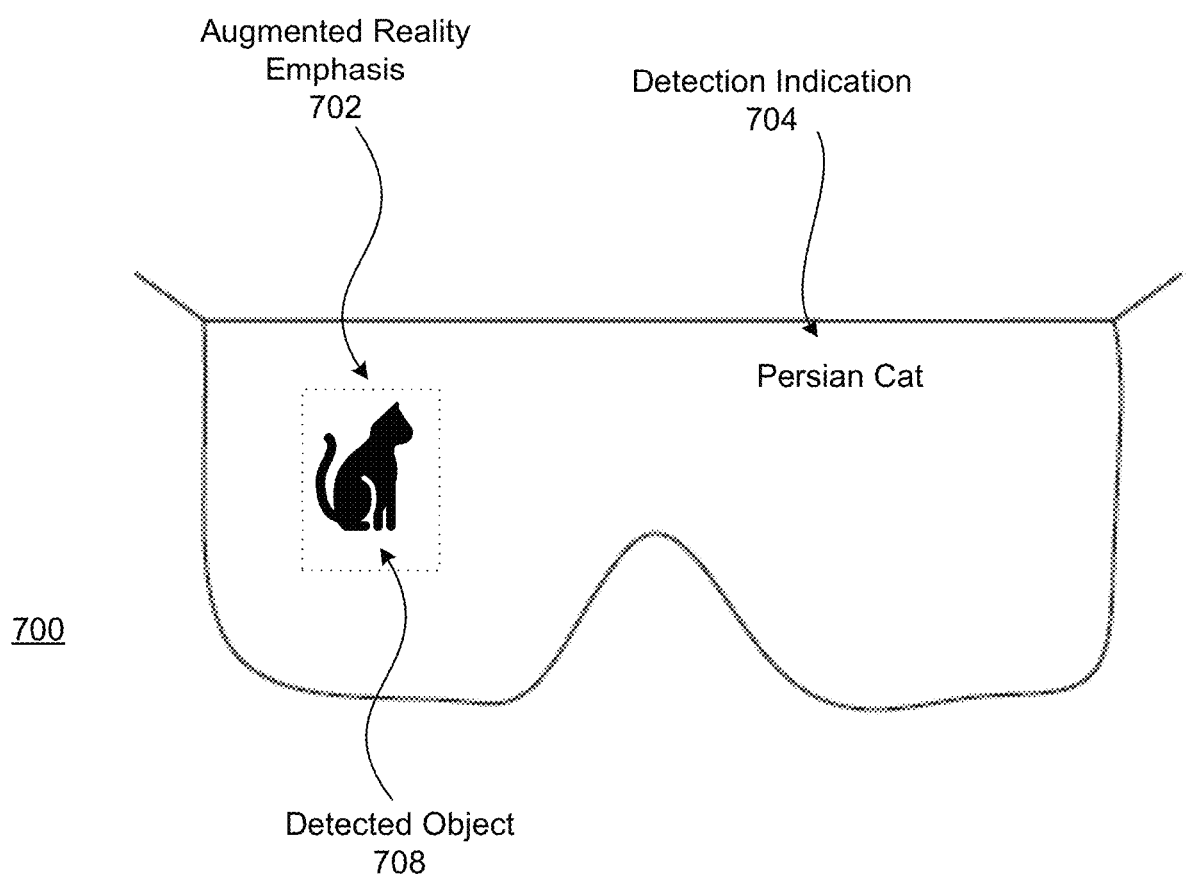
FIG. 7 illustrates an exemplary AR device signaling that an object has been detected, consistent with disclosed embodiments.

FIG. 7 depicts an exemplary AR device 700 signaling that an object has been detected, consistent with disclosed embodiments. As shown in FIG. 7, in response to detecting an object 708, AR device 700 may provide a visual indication of detection of the object. Providing the visual indication may include providing an augmented reality emphasis 702 in association with detected object 708. Although FIG. 7 shows augmented reality emphasis 702 as a bounding box, other forms of emphasis may also be provided. For example, AR device 700 (or a detection system, as disclosed above with regards to FIG. 5) may be configured to segment the detected object out of the image (e.g., using a semantic segmentation architecture such as region-based semantic segmentation, fully convolutional network-based semantic segmentation, weakly supervised semantic segmentation, or other known methods of semantic segmentation). The segment may then be displayed (e.g., in a solid color, blinking, etc.) over detected object 708, emphasizing detected object 708. In some embodiments, AR device 700 may be configured to additionally or alternatively provide a detection indication 704 for the detected object. The detection indication may indicate that an object has been detected. The detection indication may or may not provide additional information about the detected object. For example, the detection indication may simply be a light or icon that is displayed when an object is detected. Alternatively or additionally, the detection indication can include a label providing information about the detected object (e.g., a class of the detected object). In the non-limiting example depicted in FIG. 7, the label indicates that the detected object is a Persian cat.

Figure 8A:
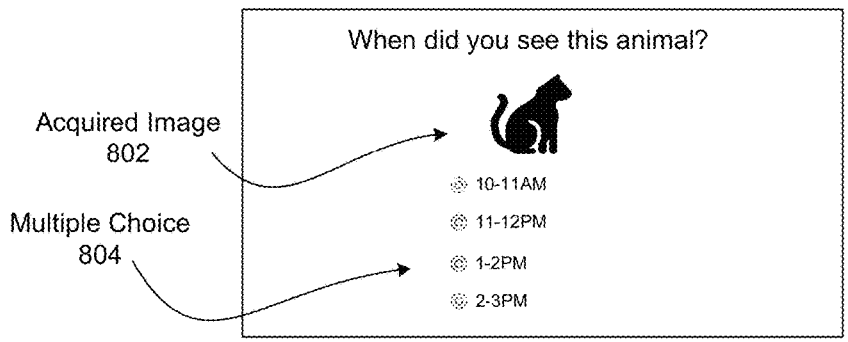
FIGS. 8A-8D illustrate four exemplary views of an authentication graphical user interface (GUI) displaying authentication questions, consistent with disclosed embodiments.

FIGS. 8A-8D depict four illustrative views of an authentication graphical user interface (GUI) displaying authentication questions, consistent with disclosed embodiments. In a multi-factor authentication arrangement, the authentication graphical user interface may be displayed as part of authentication of the user (e.g., after the user has successfully entered a user name and password, applied an authentication card to a card reader, or the like). As described herein, in some embodiments the object data may include an image of the object. In such embodiments, the graphical user interfaces depicted in FIGS. 8A and 8C may include an authentication question together with the image of the object. In contrast, the graphical user interfaces depicted in FIGS. 8B and 8D do not depict an image of the object. FIG. 8A depicts the authentication question "When did you see this animal?". The authentication system may provide a multiple-choice control specifying multiple time ranges. The user may answer the authentication question by selecting one of the multiple time ranges. The time of acquisition may be included in the object data, allowing the authentication system to verify the answer.

Figure 8B:
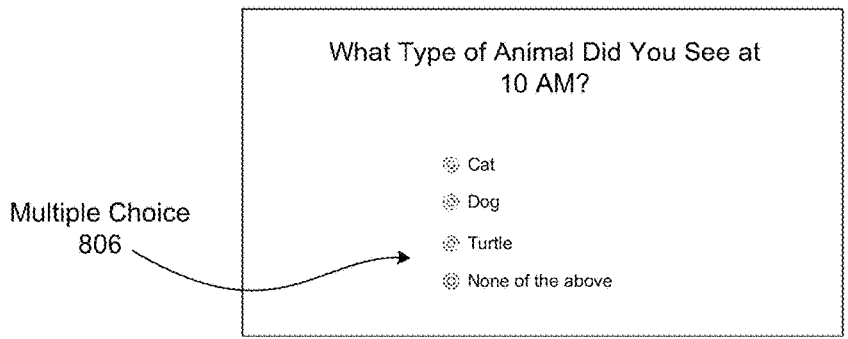

FIG. 8B depicts the authentication question "What type of animal did you see at 10 AM?" The authentication system may provide multiple potential choices. Also included can be a "none of the above" choice, reducing the likelihood of a correct answer by random guessing. As the object data may list the object type (e.g., cat) in addition to the time of acquisition, the object data may be used to verify the answer.

Figure 8C:
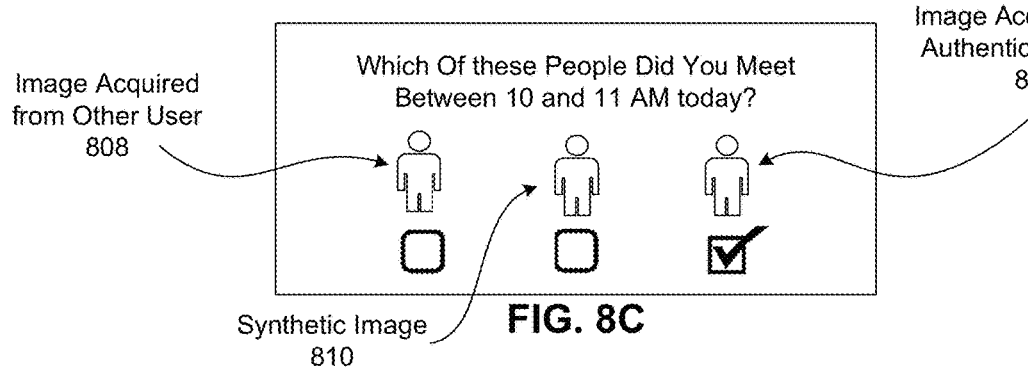

The authentication system may use object data associated with other users to generate authentication questions. For example, FIG. 8C depicts the authentication question "Which of these people did you meet between 10 and 11 AM today." This authentication question is displayed together with images (e.g., the primary image of the object from the object data and one or more alternative images). Each of the images is associated with a checkbox and the user may select zero or more of the checkboxes. The images of the people may include one or more people that the user saw between 10 and 11 AM (e.g., retrieved from multiple data objects), such as image acquired from authenticating user 812. But the images may also include an image obtained from another user (e.g., image 808) or a synthetic image (e.g., synthetic image 810) generated using machine learning (e.g., a generative adversarial network).

Figure 8D:
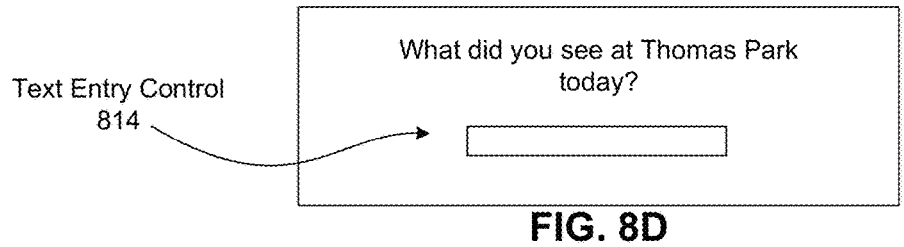

The authentication system may provide a control for text input, in some embodiments. For example, FIG. 8D depicts the authentication question "What did you see at Thomas Park today?" and provides a text entry control 814 for a user to enter a response. Multiple answers in text entry control 814 may be contemplated. The authentication system may use natural language processing, as described herein, to determine whether text entered into text entry control 814 matches the answer to the authentication question. As would be appreciated by those of skill in the art, the graphical user interfaces depicted in FIGS. 8A to 8D are exemplary and not intended to be limiting.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon. Stored on any one or on a combination of solid, tangible computer readable media, disclosed embodiments may include instructions programmed according to the disclosed teachings for controlling the devices and subsystems of embodiments, for driving the devices and subsystems of embodiments, and for enabling the devices and subsystems of embodiments to interact with a user. Such software may include, but is not limited to, device drivers, firmware, operating systems, development tools, applications software, and the like. Software implementing exemplary embodiments may include any suitable interpretable or executable code mechanism, including but not limited to scripts, interpretable programs, and a variety of programming languages, such as Java, C, C++, JavaScript, or any other now known or later created programming language.

Program instructions stored on a computer readable storage medium may include assembler instructions, machine dependent instructions, firmware instructions, source code or object code written in any combination of one or more programming languages, including object oriented programming languages, procedural programming languages, or functional programming languages. The programming language may be Fortran, Lisp, C++ or the like. The program instructions may be executed by a processor of the interaction system. In some embodiments, the program instructions may be executed by a processor of the user device, and in some embodiments, both the user device processor and the processor of the interaction system may execute program instructions.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A system for facilitating user authentication, the system comprising:
   one or more processors programmed with instructions that, when executed by the one or more processors, cause operations comprising:
   obtaining an image stream of an environment of a user;
   in response to detecting that (i) an object occurred in a threshold sample number of different samples of the image stream and (ii) the object is in a first spatial region of a first sample of the different samples, generating an authentication question using object data associated with the detected object, wherein:

the first spatial region of the first sample is a spatial region at which the user looked, the object data comprises attributes of the object derived from the image stream, and the authentication question comprises a question related to one or more of the attributes;

obtaining an authentication response from a user device of the user in connection with the authentication question, wherein the authentication response comprises the one or more of the attributes of the object; and authenticating the user based on a determination that the authentication response matches a pre-determined answer to the authentication question.

2. The system of claim 1, the operations further comprising:

determining the threshold sample number and a threshold amount of time between each of the different samples;

wherein generating the authentication question comprises:

storing, in a database, the object data associated with the object detected in the different samples of the image stream; and in response to a request to authenticate the user, generating the authentication question based on the detection of the object satisfying the threshold sample number and the threshold amount of time between each of the different samples.

3. The system of claim 1, wherein the attributes of the object data comprise an acquisition time or location at which the image stream was captured by an image capturing device associated with the user.

4. The system of claim 1, wherein the image stream comprises a video stream of the environment of the user captured via an augmented reality application.

5. A method comprising:

determining that an object detected in a set of images related to an environment of a user satisfies one or more criteria, the one or more criteria comprising (i) the object being in a plurality of different samples and (ii) the object being in a first spatial region of a first sample of the plurality of different samples, wherein the first spatial region of the first sample is a spatial region at which the user looked;

generating an authentication question based on (i) the object detected in the set of images satisfying the one or more criteria and (ii) object data associated with the detected object, the object data comprising attributes of the object derived from the set of images, and the authentication question comprising a question related to one or more of the attributes; and authenticating the user based on an authentication response obtained from a user device of the user in connection with the authentication question matching a pre-determined response to the authentication question.

6. The method of claim 5, further comprising:

storing, in a database, the object data associated with the object detected in the plurality of different samples of the set of images; and obtaining a request to authenticate the user, wherein the authentication question is generated in response to the request to authenticate the user based on (i) the object detected in the set of images satisfying the one or more criteria and (ii) the object data associated with the detected object.

7. The method of claim 5, wherein the one or more criteria comprises the object being detected in sequential samples for a threshold number of samples.

8. The method of claim 5, wherein the one or more criteria comprises the plurality of different samples satisfying a threshold amount of time between samples.

9. The method of claim 5, wherein the one or more criteria comprises (i) the object moving in the set of images in a manner consistent with motion data of an image capturing device associated with the user, the motion data representing movement of the image capturing device while the set of images is captured by the image capturing device.

10. The method of claim 5, wherein generating the authentication question comprises:

selecting, based on an acquisition time of the set of images satisfying an acquisition recency threshold, the one or more of the attributes to be used for generating the authentication question.

11. The method of claim 5, wherein the attributes of the object data comprise an acquisition time or location at which the set of images was captured by an image capturing device associated with the user.

12. The method of claim 5, wherein the set of images is captured via an augmented reality application.

13. One or more non-transitory computer-readable media storing instructions that, when executed by one or more processors, cause operations comprising:

determining that an object detected in a set of images related to an environment of a user satisfies one or more criteria, the one or more criteria comprising (i) the object being in a plurality of different samples and (ii) the object being in a first spatial region of a first sample of the plurality of different samples, wherein the first spatial region of the first sample is a spatial region at which the user looked;

generating and providing an authentication prompt based on (i) the object detected in the set of images satisfying the one or more criteria and (ii) object data associated with the detected object, the object data comprising attributes of the object derived from the set of images, and the authentication prompt comprising a question related to one or more of the attributes; and authenticating the user based on an authentication response obtained from a user device of the user in connection with the authentication prompt matching a pre-determined response to the authentication prompt.

14. The one or more non-transitory computer-readable media of claim 13, the operations further comprising:

storing, in a database, the object data associated with the object detected in the plurality of different samples of the set of images; and obtaining a request to authenticate the user, wherein the authentication prompt is generated in response to the request to authenticate the user based on (i) the object detected in the set of images satisfying the one or more criteria and (ii) the object data associated with the detected object.

15. The one or more non-transitory computer-readable media of claim 13, wherein the one or more criteria comprises the object being detected in sequential samples for a threshold number of samples.

16. The one or more non-transitory computer-readable media of claim 13, wherein the one or more criteria comprises the plurality of different samples satisfying a threshold amount of time between samples.

17. The one or more non-transitory computer-readable media of claim 13, wherein the one or more criteria comprises (i) the object moving in the set of images in a manner consistent with motion data of an image capturing device associated with the user, the motion data representing movement of the image capturing device while the set of images is captured by the image capturing device.

18. The one or more non-transitory computer-readable media of claim 13, wherein generating and providing the authentication prompt comprises:

selecting, based on an acquisition time of the set of images satisfying an acquisition recency threshold, the one or more of the attributes to be used for generating the authentication prompt.

19. The one or more non-transitory computer-readable media of claim 13, wherein the attributes of the object data comprise an acquisition time or location at which the set of images was captured by an image capturing device associated with the user.

20. The one or more non-transitory computer-readable media of claim 13, wherein the set of images is captured via an augmented reality application.

* * * * *